United States Patent
Johnson

[15] 3,640,732
[45] Feb. 8, 1972

[54] SIMULATED COOKED EGG
[72] Inventor: Ernest W. Johnson, Minnetonka, Minn.
[73] Assignee: General Mills, Inc.
[22] Filed: Oct. 9, 1969
[21] Appl. No.: 865,180

[52] U.S. Cl. ..................................................99/114
[51] Int. Cl. ..................................................A23j 3/02
[58] Field of Search ..................................99/113, 114

[56] References Cited

UNITED STATES PATENTS

| 3,362,831 | 1/1968 | Szczesniak | 99/131 |
| 3,408,207 | 10/1968 | Katz | 99/113 |
| 3,445,243 | 5/1969 | Moirano | 99/131 |
| 3,493,393 | 2/1970 | Shives | 99/113 |

FOREIGN PATENTS OR APPLICATIONS

| 503,297 | 4/1939 | Great Britain | 99/114 |

OTHER PUBLICATIONS

Jacobs, The Chemistry and Technology of Food and Food Products, 1951, pp. 190, Interscience Publishers Inc., New York, N.Y.

*Primary Examiner*—A. Louis Monacell
*Assistant Examiner*—Robert M. Elliott
*Attorney*—Anthony A. Juettner and Norman P. Friederichs

[57] ABSTRACT

The simulated egg approximates a boiled, poached or fried hen's egg. The simulated egg may be used together with other materials in a salad or eaten as is, for example, for breakfast. The simulated egg includes a white portion and a yolk portion. The white portion may be made from water, vegetable oil, a gel forming material such as low methoxyl pectin and a gel setting agent such as dicalcium phosphate. The yolk portion may be made from water, vegetable oil, protein, a gel forming material such as low methoxyl pectin, a gel setting agent such as dicalcium phosphate and coloring matter. The egg may be formed in the appropriate shape by molding.

13 Claims, No Drawings

SIMULATED COOKED EGG

BACKGROUND OF THE INVENTION

The present invention relates to a food product and more particularly to a simulated cooked egg or egg substitute.

Eggs have been part of the human diet for many years. Today eggs are eaten in a variety of ways. For example, eggs commonly are poached or fried and eaten together with toast for breakfast. Alternatively, eggs may be cooked in boiling water while still in the shell. The shell then may be removed and the cooked egg eaten, as is, or sliced and included in salads such as potato salad. "Deviled egg" is another approach for serving boiled egg. In this case the boiled egg is divided into two pieces. The yolk is removed from the white portion, mixed with various other ingredients, such as mayonnaise, butter and vinegar, and replaced in the white portion of the egg. The simulated egg of the present invention may replace the natural eggs in such uses, as well as other uses.

Natural eggs are highly nutritious as well as tasty. Natural eggs, however, possess certain inherent disadvantages. For example, the egg supply may fluctuate during the year since production materially decreases during the very cold winter months and during the very hot summer months. The cost of eggs may fluctuate throughout the year, and at times the cost may increase substantially. Natural eggs are objectionable to certain persons for dietary reasons. For example, natural eggs may be deleted from the diet of persons who must limit cholesterol intake. Furthermore, certain persons are allergic to natural eggs. Cooked natural eggs do not have good freeze-thaw stability; in other words, if natural eggs are frozen and thawed, they become tough. Moreover, natural eggs can be stored only for a limited time without degradation or spoilage; for example, natural eggs are particularly susceptible to Salmonella growth.

The present invention overcomes the aforementioned inherent disadvantages of the natural egg and in many other respects is superior to the natural egg. The ingredients of the simulated egg can be controlled to provide nutrition superior to the natural egg. For example, the simulated egg can be nutritionally fortified by the addition of vitamins and minerals, typically, calcium. Also, the simulated egg can be provided without cholesterol. The present simulated egg is free of Salmonella growth and has excellent stability during storage; for example, the simulated egg can be frozen and thawed without adverse affect on the quality of the product. The simulated egg can be produced at a cost lower than a natural egg. Furthermore, the simulated egg is not subject to seasonal fluctuations in production.

GENERAL DISCUSSION OF THE PRESENT INVENTION

The present invention provides a simulated cooked egg including a white portion and a yolk portion. The terms "egg white" and "egg yolk" (as well as similar terms) when used with respect to the present invention, of course, refer to the simulated egg white and simulated egg yolk. The white portion is made of water, oil and a gelling material. The gelling material, typically, is made from low methoxyl pectin and a setting agent, such as dicalcium phosphate. The yolk portion may include water, a protein material, such as milk solids or soy protein, coloring, flavoring and a binding agent, typically, a gel made of low methoxyl pectin and dicalcium phosphate which holds the other ingredients together. The egg may be formed into the desired shape by placing the preformed yolk and the white into a suitable mold at the time of gel formation. The simulated egg may be provided as a simulated boiled egg or, alternatively, as a simulated poached or fried egg.

The egg white will generally contain, by weight, at least 70 percent water and may contain in excess of 90 percent water. The composition of the simulated egg white and egg yolk will be stated, herein, as parts or percentages by weight, unless otherwise indicated. Any water supply which is suitable for drinking or cooking purposes, may be used in the present invention.

The egg white further contains oil, preferably a vegetable oil such as coconut oil, cottonseed oil, peanut oil or safflower oil. The oil gives the egg white the appearance and texture of a cooked natural egg. The amount of oil present will generally be between 0.2 and 6.0 percent and rarely, if ever, less than 0.1 percent or more than 20.0 percent. Preferably, the egg white contains about 4.0 percent oil.

The gel used in preparing the egg white may be may material that will form an advanced gel by chemical or temperature treatment. The cationic sensitive gel-forming materials, such as low methoxyl pectin are illustrative of the gels set by chemical treatment, and gelatin is illustrative of the gelling materials set by change in temperature. In certain use situations the material must remain in the advanced or firm gel state even through the egg is heated, for example, in sterilizing a canned product such as by retorting. This is also true, for example, in the case of a simulated poached or fried egg where the egg is heated prior to eating. In other instances the gel need not be capable of withstanding heat, for example, when the egg is used in cold salads. A gelling material that has been found highly satisfactory in the present invention regardless of the particular use of the egg is made by setting low methoxyl pectin with an alkaline metal salt such as dicalcium phosphate.

Other substances that may be used in place of the low methoxyl pectin would include carrageenan and alginates which may be gelled with the same types of setting agents as used with low methoxyl pectin. Still other gelling materials would include gelatin, starches and other gums. Moreover, mixtures of gelling materials, for example, including gelatin and low methoxyl pectin, may be used. The egg white will generally contain between 1 and 0 percent of low methoxyl pectin or other gel forming material and preferably about 3 percent. Other setting agents that may be used in making a gel would include any edible substance that would provide calcium, magnesium, aluminum or potassium ions, for example, calcium chloride. The egg white will usually contain about 0.05 percent, although it may contain as much as 5.0 percent or more of the setting agent. In this instance the setting agent should provide at least 0.015 percent available calcium. Greater amounts of the setting agent will usually not be detrimental and in some instances may be advantageous. For example, the setting agent may serve to fortify the egg white with calcium or other minerals.

The egg white may contain other materials, for example, vitamin additives, minerals and preservatives. Such further materials may be added in forms and amounts conventionally used in foods. One preservative that has been found highly satisfactory is citric acid which lowers the pH of the simulated egg white and thus promotes the functioning of mold inhibitors such as the sorbates. The citric acid also aids in dispersing and solubilizing other materials. Conventional preservatives that may be used would include BHA, BHT, potassium sorbate, and sodium benzoate. Such preservatives, typically, may be used at levels of about 0.05 to 0.1 percent by weight.

The white portion of the egg may be prepared by mixing water with the low methoxyl pectin, for example, in a Waring Blender. The oil then may be added slowly, being thoroughly dispersed during continued mixing. The setting agent, typically dibasic calcium phosphate more commonly called dicalcium phosphate, may be added next and thoroughly dispersed. The materials should be maintained at an elevated temperature throughout the mixing procedure for example, above the setting temperature of the gelable material and below the boiling temperature of the gelable material preferably, between 140° and 180° F. The resulting mixture is ready for molding into a desired shape.

The simulated egg yolk will generally contain less water than does the egg white. The yolk will, however, typically contain at least about 40 percent water and preferably about 70 to 80 percent water. The yolk may contain some oil although the oil is not essential in the yolk. The oil, if used, may be of the type described with respect to the white portion of the egg. The oil, if used, will typically be present in an amount of between 10 and 14 percent, generally less than 30 percent and rarely, if ever, more than 50 percent.

The yolk further contains a protein which may be in the form of a high protein soy material such as Textrol[1] ([1]Trademark of Central Soya Company, Inc.) or toasted Nutrisoy[2]. ([2]Trademark of Archer Daniels Midland Company). Other protein materials may be used such as low fat milk solids. If desired, a mixture of such protein materials may be used. In any event the amount of protein present should be between 1 and 26 percent, preferably about 8 to 16 percent. The protein provides structure in the yolk similar to that of a cooked natural egg which is somewhat grainy in appearance and texture. The yolk provides a substance which is highly nutritious from a protein standpoint.

The simulated egg yolk further includes a binding agent for holding the other materials together. The binder is preferably a gel such as that described with respect to the egg white. Typically the gel will be made from low methoxyl pectin, carrageenan or an alginate. The gel may be set using an ionizable salt of calcium, magnesium, aluminum or potassium. The simulated yolk will contain sufficient gelling material to hold the other materials together and typically will contain 1 to 5 percent of the gelling material although greater amounts will usually not be detrimental, and up to 5 percent of the setting agent.

The yolk, of course, contains coloring matter and preferably flavoring. Any edible coloring matter which will give the yolk the proper yellow color may be used. The coloring matter may be a vegetable dye and included at a level sufficient to give the desired color. This will generally be between 0.1 and 1.0 percent, preferably about 0.4 percent. If desired, any suitable flavoring may be used which tastes substantially like egg yolk. Such a flavoring can be provided by mixing dl methionine, l-cystine and prepared mustard. The egg yolk may contain, for example, 0.01 percent dl methionine, 0.01 percent l-cystine and about 2 to 3 percent prepared mustard. The yolk may contain a preservative in type and amount as described with respect to the egg white.

The yolk portion of the egg may be prepared by mixing water at a suitable temperature such as between 140° and 180° F. with the low methoxyl pectin, coloring and flavoring, for example, in a Waring Blender. The elevated temperature should be maintained throughout the mixing procedure. The oil next may be added slowly during continued mixing. The remaining ingredients including the protein material and the setting agent are preferably dry blended and then mixed with the liquid portion. The materials that provide ions which may set the gel forming material are added last to prevent premature gelation. For example, low fat milk solids may provide calcium ions sufficient to set up the gel even in absence of other setting agents. The yolk material may be poured into suitable spherical molds, yolk size, to gel. Alternatively, the yolk material may be set up as a gel and then cut into a shape like that of a natural egg yolk. This may be done with a spoon or the type of scoop commonly used to prepare melon balls.

Any of various methods may be used for putting the yolk and white of the simulated egg together. One of the simplest methods is to pour a first portion of the egg white mixture on a flat surface, then place the preformed yolk on this portion of egg white, and pour the remaining portion of egg white over the yolk. The white will flow much like the uncooked white of a natural egg. The egg thus formed will closely approximate a poached or fried egg in shape. Alternatively, the white may be placed in a mold having a cavity shaped similar to a boiled egg. Such a mold may be formed of two half molds. Each of the half molds may be filled with the egg white, the yolk may then be deposited in one of the half molds, and the half molds assembled preferably after the egg white has begun to thicken but before the white has completed gelation. Another method of forming the egg product would be to coextrude the egg white and egg yolk such as by forcing the egg white and egg yolk through a pair of concentric tubes. In this instance a rope, circular in cross section, would be produced having an outer layer of egg white and a core of egg yolk. The rope may be sliced, for example, one-quarter inch in thickness and used as a garnish for salads. In some instances, the egg white may be used without placing the white and yolk together, for example, when mixed into potato salad or when used in an egg salad.

The following examples are illustrative of the present invention and are not intended to be limiting. For example, various other gel-forming materials may be used, as well as various other types of vegetable oils.

EXAMPLE I

A simulated boiled egg was prepared by mixing 76.11 parts water, 3.0 parts low methoxyl pectin, 0.37 parts vegetable color (RL 303 Vegetone[3]), ([3]Trademark of General Mills, Inc.)), and 0.02 parts anhydrous citric acid in a 1-quart Waring Blender. The temperature of the materials was maintained between 140° and 180° F. throughout the mixing procedure to prevent premature gelation. After the materials were mixed for about 1 minute approximately 12.0 parts coconut oil were added slowly over a period of 1 minute. A dry blend was prepared by hand mixing 3.0 parts low-fat milk solids, 2.5 parts toasted Nutrisoy[2], ([2]Trademark of Archer Daniels Midland Company), 2.0 parts dicalcium phosphate and 1.0 part sodium chloride. The dry mixture was then added slowly over about one-half minute to the remaining materials in the Waring Blender and the materials became quite viscous. Throughout the mixing procedures of both the egg white and the egg yolk in Examples I–III, the Waring Blender was operated at the highest speed possible without excessive splashing of materials. This was generally at high speed. The egg yolk was set aside to cool and form the gel. A scoop later used to form the yolk into spheres. Egg white was prepared by mixing 92.87 parts water, 3.0 parts low methoxyl pectin, and 0.03 parts citric acid in the Waring Blender for about 1 minute. Then 4.0 parts coconut oil were slowly added over a period of 1 minute. As the oil was added, the previously clear mixture turned white in appearance. Approximately 0.10 parts dicalcium phosphate was slowly added over about one-half minute. The mixture was immediately poured into a mold comprised of two halves, each half having an internal cavity shaped similar to one-half of a boiled egg. At that time an egg yolk was added to the egg white in one of the mold halves. The mold halves were assembled and set aside to cool and to complete gelation. After the simulated egg was cooled to room temperature, it was removed from the mold. The egg was cut into slices about one-quarter inch in thickness. The resulting egg had the appearance and texture of a boiled egg. The sliced egg was used as a garnish on a potato salad.

EXAMPLE II

A simulated egg was prepared in the form of a "deviled egg." An egg white was prepared by mixing 86.90 parts of water, 3.0 parts of low methoxyl pectin and 0.05 parts citric acid in a 1-quart Waring Blender for about 1 minute. Next 4.0 parts corn oil were slowly added over about 1 minute to the mixture during continued agitation with the Waring Blender. The material turned white upon addition of the oil. A solution of calcium chloride was then slowly added over about one-half minute. The calcium chloride solution contained 6 parts water and 0.05 parts calcium chloride. The simulated egg white was then immediately placed in molds having cavities shaped like one-half of a boiled egg. After the egg white had formed into a gel, a cavity was formed in the white using a scoop. An egg yolk material was prepared by mixing 80.34 parts water, 3.0 parts low methoxyl pectin, 0.37 parts yellow vegetable color and 0.02 parts citric acid in a Waring Blender. Throughout preparation of both the egg yolk and egg white, the Waring Blender was operated at high speed. Next 12.0 parts coconut oil were slowly added during continued agitation. A dry blend was prepared by hand mixing 2.5 parts toasted Nutrisoy[2], ([2]Trademark of Archer Daniels Midland Company), 2.0 parts dicalcium phosphate, 0.06 parts paprika, and 0.03 parts tumeric powder. The dry blend was added over about one-half minute to the material in the Waring Blender. This mixture was then set aside to cool and gel. About 136 parts of the cooled egg yolk stock was mixed with 60 parts mayonnaise, 30 parts butter, 10 parts vinegar, 3 parts salt, 2.4 parts dry mustard and 0.3 parts red pepper. The yolk mixture was combined in a Waring Blender and mixed on low speed until it was smooth. The yolk material was then used to fill the cavity in the egg white halves and was served as "deviled egg."

EXAMPLE III

A simulated poached egg was prepared which included egg yolk made by mixing 50.4 parts water, 16.0 parts gelatin, and 0.6 parts low methoxyl pectin in a Waring Blender for about 1 minute. About 31.0 parts coconut oil were then slowly added during about 1 minute of continued mixing. Approximately 0.4 parts of yellow vegetable coloring was slowly added over about 1 minute of further mixing and thoroughly dispersed. The yolk was set aside to gel. Egg white was prepared by mixing for about 1 minute 91.97 parts water, 4.0 parts corn oil, 3.0 parts low methoxyl pectin, and 0.03 parts citric acid in a 1-quart Waring Blender. One part of dicalcium phosphate was then added over about one-half minute of continued mixing. The resulting mixture was poured over a preformed yolk and permitted to set into a gel. The simulated poached egg was then placed on a piece of toast and heated to about 140° F. and served. The simulated poached egg closely approximated a natural poached egg and the yolk, as generally preferred in a poached egg, was substantially softer and more fluid than the yolk of the simulated boiled egg prepared in Example I.

The embodiments of the invention in which an exclusive property or privilege is claimed are defined as follows:

1. A simulated cooked egg white comprising an advanced gel including by weight at least 70 percent water, between 0.1 and 20.0 percent vegetable oil and between 1.0 and 10.0 percent of a gelling material.

2. The simulated cooked egg white of claim 1 wherein said gel is a heat-stable gel and wherein said gelling material is a cationic sensitive gel forming material and wherein said egg white further includes a cationic setting agent.

3. The cooked egg white of claim 2 in which the gel-forming material is comprised of a member selected from the group consisting of low methoxyl pectin, carrageenans and alginates.

4. The cooked egg white of claim 3 wherein said setting agent is a member selected from the group consisting of calcium, magnesium, aluminum or potassium ions.

5. Simulated cooked egg material comprising simulated egg white portion and simulated egg yolk portion; said simulated egg white portion comprising a gelled water-oil mixture including by weight at least 70 percent water, between 0.01 and 20.0 percent vegetable oil and between 1.0 and 10.0 percent of a gelling material; said simulated egg yolk portion comprising at least 40.0 percent water, 1.0 to 26 percent protein material, edible coloring matter, flavoring and binding agent holding said yolk portion together.

6. The product of claim 5 wherein said simulated egg white includes by weight at least 90 percent water, between 0.2 and 6.0 percent oil, between 1 and 10 percent gel forming material and between 0.05 and 5.0 percent setting agent, and wherein said simulated egg yolk includes by weight at least 70 percent water, 1 to 26 percent protein and a binding agent comprising 1 to 5 percent gelling material.

7. The simulated cooked egg of claim 5 wherein said egg is a simulated boiled egg.

8. The simulated cooked egg of claim 5 wherein said egg includes flavoring including dl methionine, l-cystine and prepared mustard.

9. A method of preparing a simulated cooked egg white comprising the steps of dispersing a gelable material and a vegetable oil in water and then setting the gelable material to form an advanced gel.

10. The method of claim 9 wherein the gelable material is a member selected from the group consisting of low methoxyl pectin, carrageenan and alginates and wherein the gelable material is set by the addition of a setting agent selected from the group consisting of edible substances providing calcium, magnesium, aluminum or potassium ions.

11. A method of preparing a simulated cooked egg including a simulated cooked egg white portion and a simulated cooked egg yolk portion:
    said simulated cooked egg white portion being prepared by mixing water, a gelable material and a vegetable oil to form a dispersion and then setting the gelable material to form an advanced gel;
    said simulated cooked egg yolk portion being prepared by mixing water, a gelable material, protein and coloring to form a dispersion and then setting the gelable material to form an advanced gel.

12. The method of claim 11 wherein the gelable material in said white portion and said yolk portion is a member selected from the group consisting of low methoxyl pectin, carrageenan and alginates and wherein the gelable material is set by addition thereto of a setting agent selected from the group consisting of edible substances providing calcium, magnesium, aluminum or potassium ions.

13. The method of claim 11 wherein said egg is a simulated boiled egg and is produced by coextrusion of the egg white and egg yolk to produce an elongated rope having a core of egg yolk and an outer layer of egg white.

* * * * *